(12) United States Patent
Kantrowitz

(10) Patent No.: US 6,292,772 B1
(45) Date of Patent: Sep. 18, 2001

(54) METHOD FOR IDENTIFYING THE LANGUAGE OF INDIVIDUAL WORDS

(75) Inventor: Mark Kantrowitz, Pittsburgh, PA (US)

(73) Assignee: JustSystem Corporation (JP)

( * ) Notice: Subject to any disclaimer, the term of this patent is extended or adjusted under 35 U.S.C. 154(b) by 0 days.

(21) Appl. No.: 09/204,623

(22) Filed: Dec. 1, 1998

(51) Int. Cl.⁷ ............. G06F 17/27; G06F 17/20; G06K 9/62
(52) U.S. Cl. ............ 704/9; 704/1; 382/230
(58) Field of Search ............. 704/1, 8–10, 2; 707/530, 537, 532, 536, 101; 382/229, 230

(56) References Cited

U.S. PATENT DOCUMENTS

| | | |
|---|---|---|
| 4,058,795 | 11/1977 | Balm ................... 340/146.3 |
| 4,608,665 | 8/1986 | Yoshida ................ 364/900 |
| 4,771,401 | 9/1988 | Kaufman et al. ......... 364/900 |
| 4,773,009 * | 9/1988 | Kucera et al. .......... 704/9 |
| 4,829,580 * | 5/1989 | Church ................. 704/9 |
| 5,062,143 | 10/1991 | Schmitt ................ 382/36 |
| 5,148,367 | 9/1992 | Saito et al. ........... 364/419 |
| 5,182,708 | 1/1993 | Ejiri .................. 364/419 |
| 5,189,727 | 2/1993 | Guerreri ............... 365/2 |
| 5,222,200 | 6/1993 | Callister et al. ....... 395/112 |
| 5,371,807 * | 12/1994 | Register et al. ........ 704/9 |
| 5,392,419 | 2/1995 | Walton ................. 395/500 |
| 5,418,718 | 5/1995 | Lim et al. ............. 364/419.16 |
| 5,423,032 | 6/1995 | Byrd et al. ............ 395/600 |
| 5,425,110 | 6/1995 | Spitz .................. 382/192 |
| 5,440,615 | 8/1995 | Caccuro et al. ......... 379/67 |
| 5,548,507 | 8/1996 | Martino et al. ......... 704/1 |
| 5,550,741 | 8/1996 | Nakajima ............... 704/2 |
| 5,675,816 | 10/1997 | Yamauchi et al. ........ 395/792 |
| 5,689,616 | 11/1997 | Li ..................... 395/232 |
| 5,701,497 | 12/1997 | Yamauchi et al. ........ 395/753 |
| 5,732,276 | 3/1998 | Komatsu et al. ......... 395/751 |
| 5,768,603 | 6/1998 | Brown et al. ........... 395/759 |
| 5,913,185 * | 6/1999 | Martino et al. ......... 704/8 |

* cited by examiner

*Primary Examiner*—Patrick N. Edouard
(74) *Attorney, Agent, or Firm*—Webb Ziesenheim Logsdon Orkin & Hanson, P.C.

(57) ABSTRACT

The method of recognizing the language of a single word as to spelling and grammar correction (e.g., identifying the appropriate language resources on a document, paragraph, sentence or even individual word basis), the automatic invocation of transliteration software based on the language of the words (e.g., automatic ASCII to Kanji substitution without requiring the user to explicitly switch into a Kanji mode), the automatic invocation of appropriate machine translation tools when the document's language is different from the user's native tongue(s), the use of document language identification to eliminate from database or web search results any documents which are not written in the user's native language and the automatic identification of user-appropriate languages for the user interface.

12 Claims, No Drawings

METHOD FOR IDENTIFYING THE LANGUAGE OF INDIVIDUAL WORDS

BACKGROUND OF THE INVENTION

The state of the art for identifying the language of text documents involves the statistical analysis of the words and characters used in the entire document or sizable portions of the document. As such, the state of the art cannot identify the language of individual words in isolation, nor is it effective in identifying the language of documents that contain multiple languages, such as dual-language documents (e.g., Canadian parliamentary proceedings are printed in both English and French on the same page), or documents which contain short quotes of a foreign language or which occasionally use an isolated foreign language term.

PRIOR ART

U.S. Pat. No. 5,689,616 entitled "Automatic Language Identification/Verification System" relates to processing spoken text to extract phonetic speech features that are syllabic nuclei of languages to be identified using an artificial neural network. The method involves a comparison of the features of input speech with trained models for each language, where the models were trained using well-articulated reference speakers. The present invention is different in that it involves text, not speech, and uses a highly efficient and accurate regular expression instead of neural networks.

U.S. Pat. No. 5,189,727 entitled "Method and Apparatus for Language and Speaker Recognition" is also specific to speech and uses short frequency histograms to find the closest fit between the input speech spectra and several known languages. The present invention is different in that it involves text, not speech, and frequency spectra are irrelevant for text applications.

U.S. Pat. No. 5,548,507 entitled "Language Identification Process Using Coded Language Words" uses word frequency tables of the most common words in each language and their normalized frequency of occurrence to identify the most likely language in the document.

U.S. Pat. No. 5,701,497 entitled "Telecommunication Apparatus Having a Capability of Translation" requires the transmission of a protocol message that identifies the source language and so requires the sender to identify the language. The present invention is different in that the machine identifies the language of the sender, not the sender.

U.S. Pat. No. 5,440,615 entitled "Language Selection for Voice Messaging System" uses source information from the call (e.g., the area and country code of the caller's telephone number) to identify the most likely language used by the caller based on a stored list of the most common languages spoken at each location. The present invention is different in that it works in any textual environment and does not need the extra cues provided by a telephone caller ID system.

U.S. Pat. No. 5,392,419 entitled "Language Identification System and Method for a Peripheral Unit" tabulates syntactic cues present in the language to be identified. Each cue is assigned a positive or negative score for each language and the overall score for the document is the sum of the scores for the syntactic cues detected in the document. The language with the highest score is selected as the most likely language used in the document.

U.S. Pat. No. 5,062,143 entitled "Trigram-Based Method of Language Identification" uses letter trigrams to identify the language used in the document. For each language, it tabulates the trigrams that are most distinctive for the language (i.e., those that appear above a given frequency). It counts the number of such trigrams that appear in the document, comparing it to the total number of trigrams in the text. If the ratio is above a predetermined threshold, the document is identified as possibly using the associated language. The language with the highest ratio is selected as the language in which the document is written. The present invention is, however, not limited to letter trigrams, but uses letter n-grams of any length. Moreover, U.S. Pat. No. 5,062,143 allows the trigrams to overlap, whereas the present invention prevents the n-grams from overlapping and requires each word to be split into a sequence of language-specific n-grams without gaps or leftover letters. The present invention also allows some n-grams to be restricted to occurring in certain positions of the word, such as at the beginning, middle or end of the word. These differences are the keys to the higher accuracy of the present invention.

U.S. Pat. No. 5,425,110 entitled "Method and Apparatus for Automatic Language Determination of Asian Language Documents" distinguishes different Asian languages in printed documents containing Asian characters by comparing histograms of optical pixel density of the connected components of the document image with profiles for each Asian language.

The present invention is different from these systems in that it identifies the language of individual words with very high accuracy, not entire documents. This allows the present invention to operate on a word-by-word basis, correctly identifying the language of words even when the document contains multiple languages (e.g., Canadian parliamentary proceedings contain both English and French) or includes short quotes of one language within a document that is mostly another language. This allows language-specific functionality, such as language-specific spelling correction and transliteration (e.g., ASCII-to-Kanji conversion of Japanese Romaji to Kanji letters) to occur on a word-by-word basis. The language identification statistics for the individual words of a document can be combined to identify the overall language of a document with much higher cumulative accuracy than the state of the art. It can also identify the number of languages present in mixed-language documents, the identity of the language and the relative frequency of occurrence of the language's lexicon. The present invention is also much more efficient in operation than the state-of-the-art methods.

SUMMARY OF THE INVENTION

Briefly, according to this invention, there is provided a computer implemented method of determining if a word is from a target language comprising the steps of decomposing the word into a plurality of n-grams and determining if a first n-gram, one or more following n-grams, if present, and a last n-gram match non-overlapping n-gram patterns characteristic of words in the target language. There is further provided a computer method for using regular expressions or finite state automata to identify the language of individual words. This method uses character n-grams of any length (e.g., unigrams, bigrams, trigrams, and so on, not just trigrams) to identify the language of individual words in isolation with high accuracy. Preferably, the method according to this invention uses regular expressions (e.g., from the Perl language) or finite state automata that recognize words as a sequence of non-overlapping n-grams without gaps. Preferably, the method recognizes words by testing a word for a sequence of n-grams without ignoring n-grams at the start or end of the word, preferably, without ignoring n-gram gaps or considering overlaps of n-grams anywhere in the word and, more preferably, testing the word for a sequence of n-grams using character n-grams with position restrictions (e.g., does an n-gram appear at the beginning, middle or end of the word).

DESCRIPTION OF THE PREFERRED EMBODIMENTS

This invention consists of a computer method for identifying the words of a particular language. As used herein, the term "word" is used in its normal sense to mean a string of characters that as ordered have meaning in a given language. The method has been implemented in the Perl language as described, for example, in *Learning Pern* by Randal L. Schwartz & Tom Christiansen (O'Reilly & Associates, Inc. 1997) with a matching expression. The matching expression tests a string of characters for an n-gram match at the beginning of the word, followed by one or more of a small set of n-grams within the word, followed by a match at the end of the word. This matching expression, also known as a regular expression in Perl, attempts to split the word into a sequence of n-grams from a postulated language without overlap, gaps or leftover letters. The n-grams may be syllabic in nature, but do not need to be. Unlike other n-gram-based language identification methods, this method requires the word to be entirely decomposable into n-grams that are common in the target language. This method is therefore much more constraining than previous methods which do not have any restrictions on the position of the n-grams or the amount of overlap.

For example, here is a regular Perl expression that distinguishes Japanese Romaji terms from English terms:

^([aeiou][bgkmrp][aiueo]|kk[aeiou]|pp[aeiou]|ss[aeiou]|
[mn ][bghjknmr]y[aou]|j [aiou][yz][auoe][sn][aeoui]|
[cs]h[aio u][dt][aeo]|tsu|h[aieo]|fu|w[ao])+$ The ^ character signifies the start of the word and the $ character signifies the end of the word. The + character signifies one or more copies of the contents of the parentheses. The vertical bar | signifies disjunction, allowing a match with any of the disjuncts. Square brackets indicate a choice of any of the enclosed characters. For example, [cs]h[aiou] represents any of the following strings of characters: cha, chi, cho, chu, sha, shi, sho and shu.

This regular expression was constructed using a combination of automatic and manual methods. To construct this regular expression, a computer program was written to gather n-gram statistics from a language's lexicon, specifying whether the n-gram occurred at the beginning, end or middle of the word. The most frequent n-grams were then examined manually to determine whether they were distinctive for the language (e.g., checking whether they also matched a potentially confusable language like English) and whether they were quasi-syllabic in nature There was a distinct preference for n-grams that appeared at the beginning or end of the word. After those n-grams were obtained, the n-gram statistics were gathered again on the result of stripping the current set of n-grams from the beginning and end of the word, yielding statistics for just the word stems. This process was repeated iteratively, until no stems were left. The resulting regular expression was then manually compressed by identifying similar n-grams that could be more compactly represented using regular expression syntax. In some cases, the regular expression components were made more general for the sake of brevity without significant loss of accuracy. For example, [cs]h[aiou] has been used even though there was no cha n-gram in the data. In many cases, this attempt to achieve a more compact and elegant regular expression increased the accuracy of the resulting regular expression.

To test this regular expression, a Perl program was used to match the expression against every word in a large lexicon of English words and every word in a large lexicon of Japanese Romaji words. It matched 97.5% of the Japanese words and only 1.7% of the English words. The Japanese words it missed were mostly words and commercial terms of a non-Japanese structure and/or origin, such as "advantest"; "autobacs", "bellsystem", "cabin", "clarion", "cleanup", "corolla", "duplo", "energy", "fabrica", "gastec", "hogy", "nikomart", "pilot" and "video". The English words that were matched included many of a Japanese origin, such as "ainu", "kabuki", "kanji", "katakana", "kikuyu", "aikido", "bonsai", "geisha", "guru", "haiku", "hibachi", "judo", "jujitsu", "kamikaze", "karaoke", "karate", "kimono", "mikado", "mimosa", "origami", "samurai", "shogun", "sushi", "tempura", "tofu", "tsunami" and "yoga", as well as several English words with a distinctly Japanese appearance, such as "adobe", "agape", "bazooka", "fungi", "potato", "tomato" and "bikini". There are a few words that appear in both English and Japanese lexicons, such as "sake", that are ambiguous.

If a word is ambiguous, such as "sake", and is not quoted, the regular expression can be used to examine the language of the surrounding words with the "majority vote" winning. If there are votes for several languages, the languages with more than a user-specified fraction of the vote (e.g., 25%) will be identified as the language of the document with the language with the most votes being listed as the primary language. This allows the regular expression to identify the languages used in mixed-language texts.

A similar method could be used to deal with "noise". For example, if all the words in a paragraph but one are identified as belonging to a particular language, it might be reasonable to assume that the odd word is also of that language. The only exception would be if that word is set off by quotation marks, italicized, or otherwise marked as unusual. The strength of the present method is that it works on individual words. If a document or passage is determined using this method to be monolingual with a high degree of certainty, then one could use that to assume that all the words in the document are of that language. For example, spelling errors might result in words that appear to belong to a different language. In that case, we would not want spelling correction algorithms for that language to apply, but for the main language.

The invention has been implemented with a Perl program that tests the regular expression against the words of a lexicon and counts the number of matches and mismatches. Due to the simplicity of the regular expression, integrating it into other applications is not difficult. The regular expression of Perl represents a simple and efficient way to test whether a given word is of the typical form of a given language. The computer method, according to this invention, can be implemented, if not as easily in Perl, with other languages and programming techniques, such as a simulated finite state machine.

The method is not restricted to trigrams, but allows arbitrary n-grams. overlapping trigrams are not counted. Instead, the word is decomposed into a non-overlapping, non-gapped sequence of characteristic n-grams for the language.

In an alternate embodiment, it may be desirable to test for different n-grams at the start, middle and end of a word. This can be implemented with a regular expression as follows:

^(n-gram start patterns)(n-gram middle patterns)+(n-gram end patterns)$

With this expression there must be one or more n-gram middle patterns. The regular expression might also be implemented as follows:

^(n-gram start patterns)(n-gram middle patterns)*(n-gram end patterns)$

With this expression zero or more middle patterns are matched.

The method may make use of character n-grams that are not distinctive for a language as part of the language recognizer (e.g., regular expression) as a kind of "glue" that connects the n-grams that are distinctive for a language. Non-distinctive n-grams are n-grams that are present in the target language but not so typical of the language as to immediately identify the language. The prior art that does not restrict n-grams to be nonoverlapping and non-gapped ignores the glue. This invention goes beyond the prior art by adding the glue. The key idea here is that although the non-distinctive n-grams do not contribute to the identification of the language, they can contribute to the non-identification of the language. In other words, if a word contains a non-distinctive n-gram between two distinctive n-grams, whether that non-distinctive n-gram is legal for the language might help eliminate the language from consideration. Said another way, if an n-gram appearing in a target language is not included in the regular expression, the regular expression will return a false when testing a word containing that n-gram. For example, Japanese Romaji does not include the letter "L", so words which contain this letter have very low probability of being Japanese. This is in contrast with the letter "K", which is non-distinctive for Japanese but nonetheless present. When the state of the art discards non-distinctive n-grams from their algorithms, they are throwing away a good source of negative evidence.

By using this method for high accuracy identification of the language of each word in a sentence, the language of a sentence can be identified with essentially no errors.

The present invention determines whether or not a word is in the lexicon of a specific language. It is possible that a word may satisfy the recognizer (statement of n-gram patterns) for more than one language, using multiple parallel recognizors for specific languages, we can identify the languages to which the word belongs. If a word matches several recognizors, one can either weigh each language equally or use the language of the words on the left and right to disambiguate the possibilities. For example, if both neighboring words are English and the current word is recognized as being both English and Japanese, the current word would be deemed to be English. On the other hand, if one of the neighboring words was Japanese, both English and Japanese would be reported.

The method herein has been described for identifying the language of single words in isolation. To identify the language or languages of larger collections of words (e.g., phrases, sentences, paragraphs, chapters and documents, as well as bags of words) with extremely high accuracy, the method is repeated word by word. Each word is given one vote as to the language of the collection of words. Any language with more than one-quarter (25%) of the votes (or a similar threshold, which can be set by the user) is identified as a language of the collection with the language that gets the most votes being identified as the primary language. This allows the present invention to identify the language of a collection with high accuracy while also recognizing the languages of mixed-language collections. The combined accuracy will exceed the accuracy of individual words due to the nature of combinations of statistical evidence. For example, given an accuracy of 97.5% in recognizing the language of individual words, the combined accuracy for a sentence containing two words is 99.938%, for a sentence containing three words is 99.998% and for a sentence containing four words is 99.99996%.

There are many practical applications of this technology. All current Japanese word processing systems require the user to explicitly switch from a Japanese mode into an English mode. The same is true of other foreign language word processing systems, where the user must explicitly state the target language. The present invention eliminates this step, allowing the user to type in English or Romaji as needed, with the system automatically distinguishing between the two and converting the Romaji to Kanji as necessary. In a mixed-language document, this regular expression can be used to select the appropriate dictionary and thesaurus for use with the word. It can also be used to select the appropriate spelling correction and grammar correction algorithms. In computer user interfaces, it can be used to automatically select the language in which the system interacts with the user (e.g., the language of menus and help systems), to identify the source language for machine translation applications without requiring the user to explicitly specify the source language, and to identify the most likely ancestry and/or native language of a person by identifying the language of their name.

The method of recognizing the language of a single word has applications to spelling and grammar correction (e.g., identifying the appropriate language resources on a document, paragraph, sentence or even individual word basis), the automatic invocation of transliteration software based on the language of the words (e.g., automatic ASCII to Kanji substitution without requiring the user to explicitly switch into a Kanji mode), the automatic invocation of appropriate machine translation tools when the document's language is different from the user's native tongue(s), the use of document language identification to eliminate from database or web search results any documents which are not written in the user's native languages and the automatic identification of user-appropriate languages for the user interface.

The invention herein goes beyond the state of the art by being able to identify the language of individual words in isolation with high accuracy. The accuracy in identifying the language of individual words typically is equal to that of whole-document language identification systems. When the language identification of individual words is combined for all the words in a document, the overall accuracy significantly exceeds that of whole-document systems. Moreover, the ability to identify the language of individual words permits document processing resources to be applied on a word-by-word basis. For example, it allows for the spelling correction of a mixed-language document, allowing the spelling correction software to select the appropriate language for each word. It also allows the automatic substitution of Kanji for Romaji in mixed Japanese-English documents, without requiring the user to explicitly switch from one language to another.

This invention is not limited to comparing only two languages. First, a collection of regular expressions for pairwise distinguishing languages can be used to identify the language of a word. Moreover, lexicons of multiple languages could be merged to distinguish, for example, English words from the words present in any one of a dozen other languages.

Having thus defined the invention in the detail and particularity required by patent laws, what is desired protected by letters patent is set forth in the following claims.

I claim:

1. A computer implemented method of determining if a word is from a target language comprising the steps of:

decomposing the word into a plurality of non-overlapping n-grams covering the entire word without gaps and without crossing word boundaries and including a first n-gram, one or more following n-grams, if present, and a last n-gram, determining if the first n-gram, one or more of the following n-grams, if present, and the last n-gram match non-overlapping n-gram patterns characteristic of words in the target language, and identifying the word as from the target language if the plurality of non-overlapping n-grams match the non-overlapping n-gram patterns characteristic of words in the target language.

2. The method of claim 1 wherein the plurality of n-grams is determined to match non-overlapping n-gram patterns using regular expressions or finite state automata.

3. The method of claim 2 wherein the word is decomposed by treating the word as a sequence of non-overlapping n-grams without gaps.

4. The method of claim 1 wherein the word is decomposed by treating the word as a sequence of n-grams without gaps.

5. The method of claim 1 wherein the word is decomposed by treating the word as a sequence of n-grams with position restrictions.

6. The method of claim 1, further including the step of determining a most probable language of the word where more than one language is suggested by processing neighboring words such that if both neighboring words are of a first language and the word is recognized as being of both the first and a second language, then the word is deemed of the first language.

7. The method of claim 1, further including the step of determining a language of a sequence of words where if more than a given ratio of words in the sequence of words is found characteristic of the target language, deeming the sequence of words to be in the target language.

8. The method of claim 1, further including the step of determining a language of the word in a sequence of words where if a given word in the sequence of words is not found to be of a given language of a substantial number of remaining words in the sequence of words and is not set off by quotation marks, italicized, or otherwise marked as unusual, then considering the word to be a misspelled variant of a word in the given language.

9. The method of claim 1, further including the steps of:

repeating the steps for each word in a sequence of words of not more than about five words, and selecting an appropriate language resource if at least one word in the sequence of words is identified as being of the target language.

10. The method of claim 1, further including the steps of:

repeating the steps for each word in a sequence of words of not more than about five words, and selecting a language of a computer user interface if at least one word in the sequence of words is identified as being of the target language.

11. The method of claim 1, further including the steps of:

repeating the steps for each word in a sequence of words of not more than about five words, and selecting a source language of a computer translation program if at least one word in the sequence of words is identified as being of the target language.

12. The method of claim 1, further including the steps of:

repeating the steps for each word in a sequence of words of not more than about five words in a document query, and selecting a language of documents to be retrieved in an information retrieval system if at least one word from the document query is identified as being of the target language.

* * * * *

UNITED STATES PATENT AND TRADEMARK OFFICE
CERTIFICATE OF CORRECTION

PATENT NO. : 6,292,772 B1
DATED : September 18, 2001
INVENTOR(S) : Mark Kantrowitz Page 1 of 1

It is certified that error appears in the above-identified patent and that said Letters Patent is hereby corrected as shown below:

<u>Title page,</u>
Item [56], References Cited, U.S. PATENT DOCUMENTS, reference "5,675,816" should read -- 5,675,815 --.

<u>Column 3,</u>
Line 15, "*Learning Pern*" should read -- *Learning Perl* --.
Line 35, move the diagonal (/) from after "[yz]" to after "[aiou]".
Line 54, after "in nature" insert period (.).

<u>Column 4,</u>
Line 61, "overlapping" should read -- Overlapping --.

Signed and Sealed this

Ninth Day of April, 2002

Attest:

Attesting Officer

JAMES E. ROGAN
*Director of the United States Patent and Trademark Office*